United States Patent
Chae

(10) Patent No.: US 7,107,345 B2
(45) Date of Patent: Sep. 12, 2006

(54) METHOD FOR MANAGING SOCKET IN MOBILE COMMUNICATION SYSTEM

(75) Inventor: Woong Hee Chae, Seoul (KR)

(73) Assignee: LG Electronics Inc., Seoul (KR)

(*) Notice: Subject to any disclaimer, the term of this patent is extended or adjusted under 35 U.S.C. 154(b) by 682 days.

(21) Appl. No.: 09/997,313

(22) Filed: Nov. 30, 2001

(65) Prior Publication Data

US 2002/0087700 A1    Jul. 4, 2002

(30) Foreign Application Priority Data

Nov. 30, 2000 (KR) .................. 10-2000-0071969

(51) Int. Cl.
*G06F 15/16* (2006.01)
(52) U.S. Cl. .............. 709/227; 370/464; 370/466; 370/467; 714/1; 714/23; 714/25
(58) Field of Classification Search ........ 709/223–229; 455/436–450; 370/464, 466, 467; 714/1–10, 714/23, 25
See application file for complete search history.

(56) References Cited

U.S. PATENT DOCUMENTS

| | | | | |
|---|---|---|---|---|
| 4,827,499 A | * | 5/1989 | Warty et al. | 455/560 |
| 5,652,832 A | * | 7/1997 | Kane et al. | 714/2 |
| 5,825,890 A | * | 10/1998 | Elgamal et al. | 713/151 |
| 6,205,581 B1 | * | 3/2001 | Kang | 717/173 |
| 6,542,734 B1 | * | 4/2003 | Abrol et al. | 455/412.1 |
| 6,564,060 B1 | * | 5/2003 | Hoagland | 455/450 |
| 6,701,449 B1 | * | 3/2004 | Davis et al. | 714/4 |
| 6,754,714 B1 | * | 6/2004 | Chebrolu | 709/229 |
| 6,758,730 B1 | * | 7/2004 | Bernhard | 451/349 |

* cited by examiner

*Primary Examiner*—David Wiley
*Assistant Examiner*—Duyen Doan
(74) *Attorney, Agent, or Firm*—Fleshner & Kim, LLP

(57) ABSTRACT

Disclosed is a method for managing a socket to release the socket allocated to a call control processor (CCP), based upon a status of a target processor, in a radio network controller (RNC). The method of the present invention includes allocating a socket corresponding to a CCP in a plurality of target processors, communicating with the plurality of target processor using the allocated socket, and releasing the socket allocated to corresponding target processor based on the reception of the message.

16 Claims, 3 Drawing Sheets

METHOD FOR MANAGING SOCKET IN MOBILE COMMUNICATION SYSTEM

BACKGROUND OF THE INVENTION

1. Field of the Invention

The present invention relates to a mobile communication system, and more particularly, to a method for managing a socket allocated to a call control processor in a mobile communication system.

2. Description of the Related Art

A socket is used for transmitting data using a specific protocol between a server and a client. The communication between processors via the socket is based on a client-server model. A client processor can communicate with the server processor through the socket connection. For this, the client processor generates an undesignated socket and requests a connection with a socket designated by the server. Therefore, if the connection is successfully completed, each file descriptor is supplied to the server and the client, and both file descriptors can be used for reading and writing.

A general server processor first initializes itself, and then waits for a service request from a client. At this time, a specific port number is allocated by the server for receiving a request from the client. This port is monitored by the server processor. When the client transmits data to an address and a port of the server, the server shifts out of the waiting status so as to execute the requested service. If the requested service is an interlink type service, a linkage is established and maintained until the linkage is expressly cut off. Since bi-directional transmission is supported through the socket communication, when one socket is opened, both data transmission and reception can be simultaneously executed via the socket.

The above-described socket can be implemented by a mobile communication system using a TCP/IP to periodically manage a status of each process.

FIG. 1 is a diagram of a related art mobile communication system that performs call control processing. Referring to FIG. 1, the mobile communication system includes a Base Station Manager (BSM) 130, a Radio Network Controller (RNC) 100, and a plurality of Base Stations (BSs) 120a~120n. The BSM 130 is used to manage radio resources in the RNC 100. The RNC 100 receives information from the plurality of BSs 120a~120n. The RNC 100 provides the received information to a higher layer to a core network (not illustrated), and transmits information received from the higher layer to the plurality of the BSs 120a~120n. The plurality of the BSs 120a~120n provide the information received from the RNC 100 to a user, and transmit information inputted from the user to the RNC 100. The information may include voice data, character data, control commands, and the like.

The RNC 100 preferably includes a Call Control Processor (CCP) 110, a Service Control Processor (SCP) 112, a Switch Module Processor (SMP) 114, and a Vocoder Multichannel Processor (VMP) 116. The CCP 110 is a main processor that controls a call processing of the RNC. The SCP 112 is a processor for managing a signal point, and executes connection management relating to a Number 7 signaling network. Moreover, the SMP 114 is a processor to control selectors in a mobile communication system, and may perform a function of selecting information received from the plurality of the BSs 120a~120n. The VMP 116 is a processor for controlling a vocoder, which performs a function of decoding encoded voice data into PCM data in a mobile communication system.

The CCP 110, which is connected through a Board Support Package (BSP) 121 as a main processor in the plurality of BSs 120a~120n and the socket, periodically controls the status of the BSP 121. Moreover, the CCP 110 is connected to SCP 112, SMP 114, and VMP 116 in the inner part of the RNC 100, and can control the status of each of the processors 112, 114, 116.

As described above, the CCP 110 requires numerous socket resources because it is connected to each of the processors 112, 114, 116, 121 (hereinafter, the plurality of target processors) and the socket, and has to control a status of each of the plurality of target processors.

FIG. 2 is a flow chart illustrating a related art method for monitoring a status of each processor using the socket. Referring to FIG. 2, the CCP 110 allocates a socket to each of the plurality of target processors 112, 114, 116, and 121, so as to periodically control the status of each of the plurality of target processors (Step 201). At this time, each of the plurality of target processors, as well as the socket allocated to the CCP, allocates its own socket for communicating with the CCP 110.

When the socket is allocated to each of the target processors, the CCP 110 may periodically receive a status message from the plurality of target processors. The CCP 110 reports the received status information to the BSM 130. Furthermore, the CCP 110 transmits its own status to each of the plurality of target processors using a message (Step 211). In this case, the CCP 110 transmits the status message in a prescribed form when the plurality of the target processors request a status message via the socket.

Accordingly, each processor's status is periodically communicated between the CCP 110 and the plurality of target processors based on the connection through the socket.

When communicating through the socket, the communication is executed by an application layer via the transport layer, and not via a network layer. Further the communication is performed in accordance with an Internet Protocol (IP). The IP allows for transmission of data packets between other networks according to the IP address and thus provides path control. IP is typically used with a Transmission Control Protocol (TCP) or a User Datagram Protocol (UDP), which are protocols included in the transmission layer. Because the CCP 110 utilizes the TCP/IP, it is necessary to allocate socket resources to each of the plurality of the target processor.

The socket can be classified into either a stream socket that utilizes TCP or a datagram socket that utilizes the UDP, according to the transmission protocol it utilizes. The UDP's main function is to designate ports of a receiving body and a sending body by a UDP header. The port is a number for discriminating the receiving body and the sending body through a service or a higher protocol in the inner portion of a host that has an IP address. The TCP, on the other hand, provides the port designating function, and further includes a transmission controlling function for controlling a communication sequence, answering back, re-transmission, data stream, urgent data, congestion and the like.

Referring again to FIG. 2, when a status message is received from one of the plurality of target processors, the CCP 110, may generate a status change command based on the status messages. The CCP 110 then transmits the status change command to the corresponding processor (Step 221). The corresponding processor is then able to change its status according to the status change command.

The related art socket management has numerous problems. For example, as described above, the status of other processors between the CCP and the plurality of target processors can be monitored by periodically exchanging the status thereof. However, in the related mobile communication system using the IP, numerous socket resources are required because the CCP must allocate a socket to each of the plurality of target processors to be communicated with.

Moreover, in the related CCP, if a socket is allocated to a processor that is not mounted or is not properly functioning, a socket is allocated to a target processor which should not be allocated. Accordingly, socket resources are wasted. Specifically, although the disconnected target processor is not monitored when disconnected communication occurs in the related CCP, the socket resource is not withdrawn.

Moreover, the status messages are continuously and repeatedly transmitted to the plurality of the target processors in the related art CCP, causing the loads in the CCP to be increased.

Additionally, when a socket is allocated to a processor which does not need to be communicated with or is continuously allocated for the transmission of a status message because the CCP fails to withdraw the allocated socket resources, call control processing may not be properly executed if the socket resource is not corrected or withdrawn.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide a method for managing a socket to monitor a status of a target processor based on whether a message transmitted from the target processor is received or not.

Another object of the present invention is to provide a method for managing a socket to release the socket allocation if an error occurs at a target processor.

It is another object of the present invention to provide a method for managing a socket to release the socket in accordance with a reception of a message transmitted from the target processor.

It is another object of the present invention to provide a method for managing a socket CCP according to a status of a target processor in a radio network controller RNC.

To achieve at least the above objects in whole or in parts, there is provided a method for a socket management in a mobile communication system, including allocating a socket corresponding to a call control processor in a plurality of target processors, communicating with the plurality of target processor using the allocated socket and releasing the socket allocation to the corresponding target processor depending on the reception of the message.

To achieve at least the above objects, in whole or in parts, there is further provided a method for a socket management in a mobile communication system, including communicating with a plurality of target processors utilizing a socket allocated corresponding to the plurality of target processors, transmitting a status confirmation message to the target processor which has received the message depending on the receipt of the message and executing a socket management based on the response to the status confirmation message.

To achieve at least the above objects, in whole or in parts, there is further provided a method of managing a socket in a mobile communication system, including allocating a socket between a call control processor (CCP) and each of a plurality of target processors, sending a request status message from the CCP to each of the target processors using the corresponding socket, sending a status confirmation message from the CCP to non-responding target processors, and one of reallocating the socket to the non-responding processors and releasing the socket to the non responding processor.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENT

Figure 1:
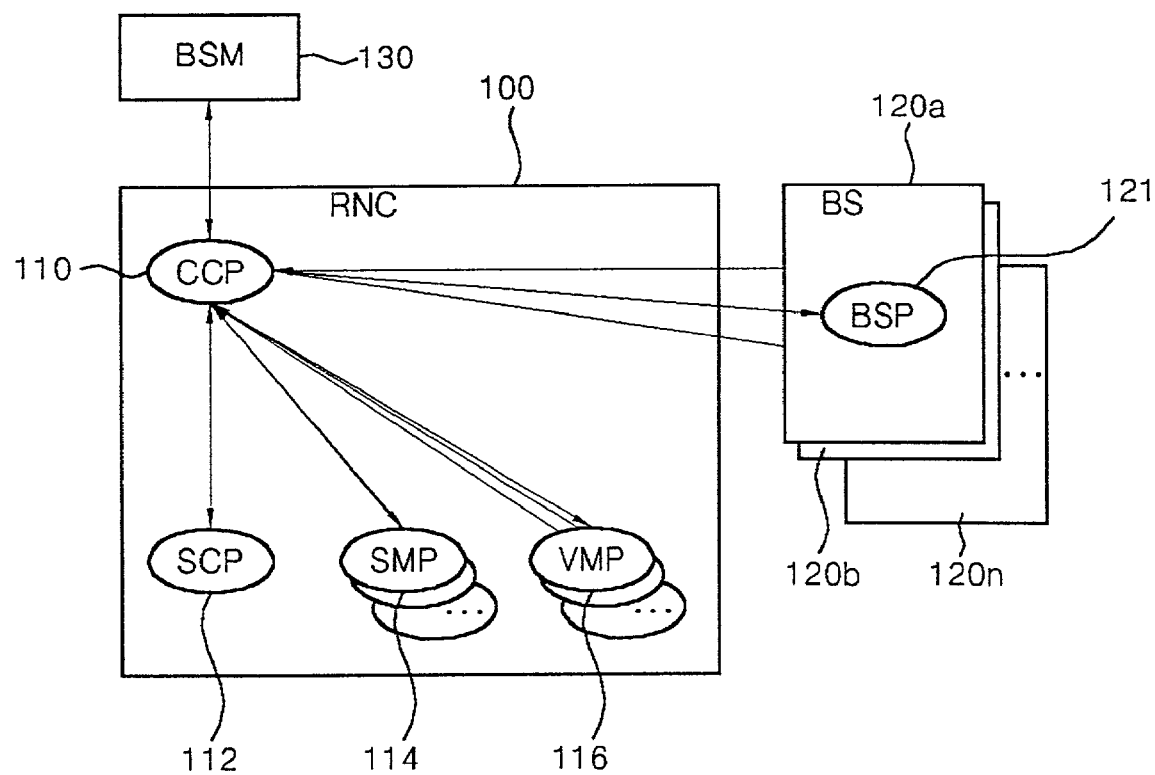
FIG. 1 is a diagram illustrating a related art mobile communication system for call control processing.
Figure 2:
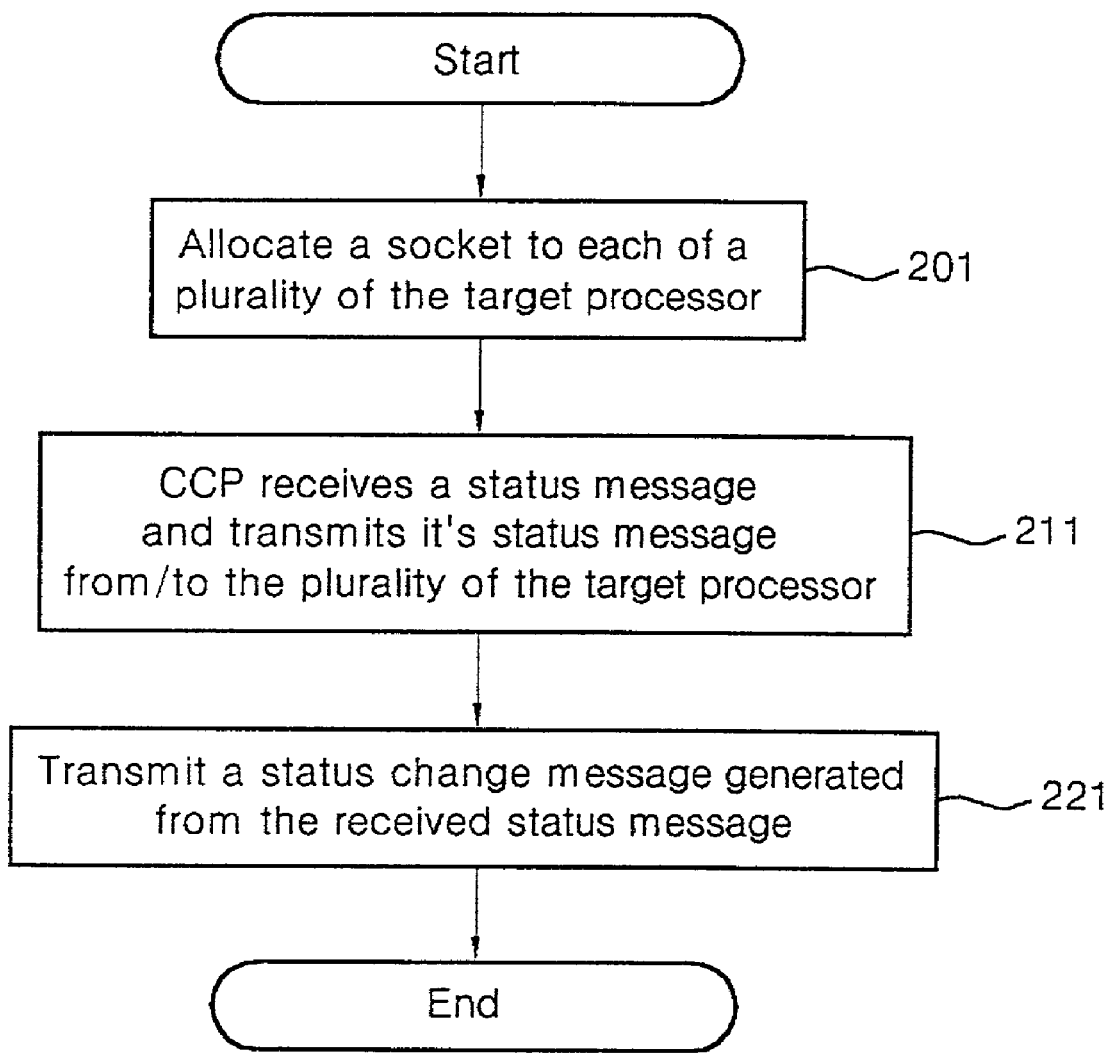
FIG. 2 is a flow chart illustrating a related art method for monitoring a status of each processor using a socket.
Figure 3:
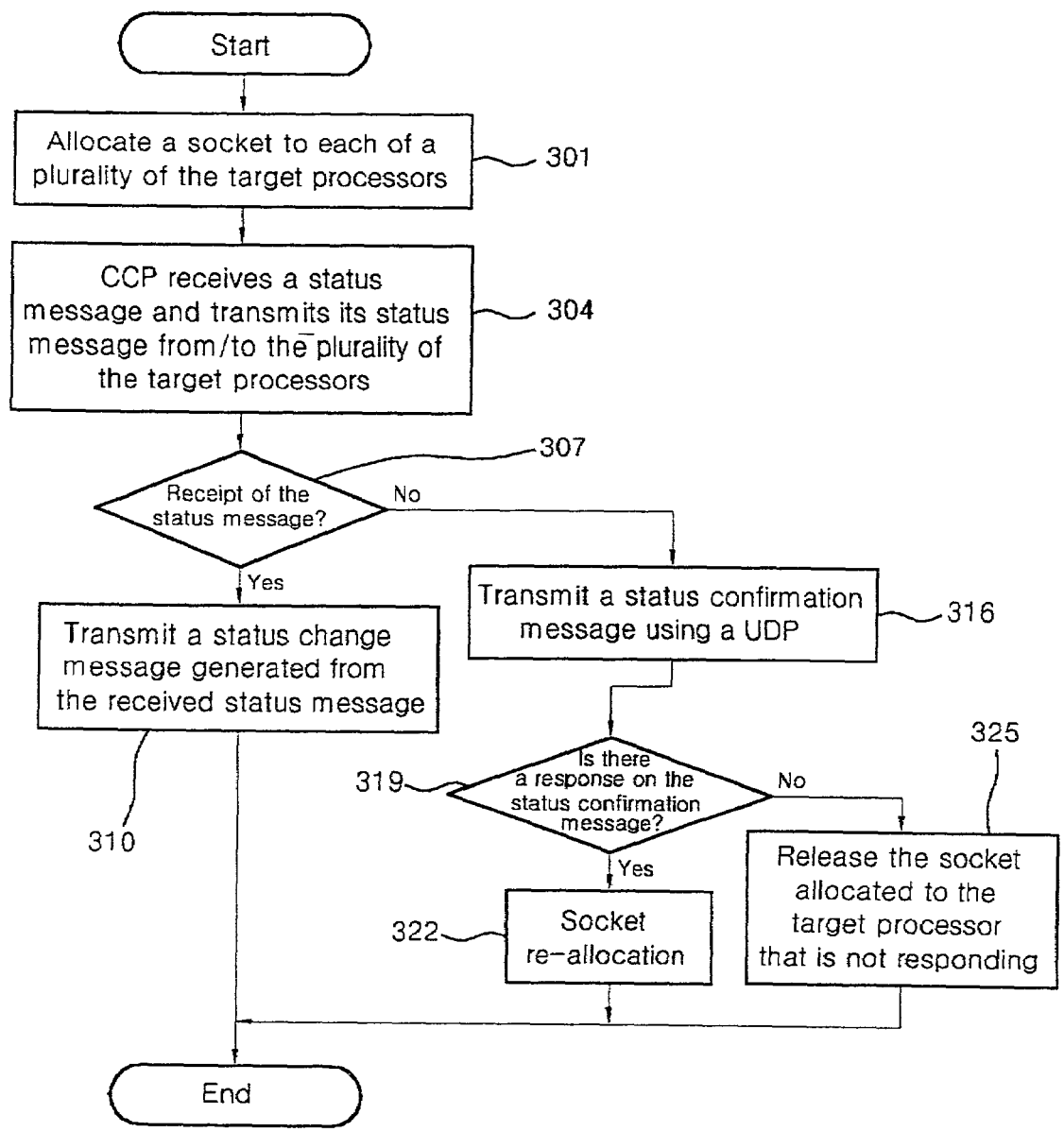
FIG. 3 is a flow chart illustrating a method for managing a socket allocated corresponding to each processor in a mobile communication system where the status of each processor is monitored using the socket according to a preferred embodiment of the present invention.

FIG. 3 is a flow chart showing a method for managing an allocated socket corresponding to each processor in a mobile communication system where the status of each processor is monitored using the socket, according to a preferred embodiment of the present invention. It is noted that the preferred embodiment is described with reference to the block diagram of the mobile communication system in FIG. 1, in which the same reference numbers represent the same elements. Moreover, the method according to the present invention is preferably realized through the use of a control block, a socket communication device, and the like, within the CCP. Although, the control block and the socket communication device are hardware-like terms, the terms are used to emphasize those functions work at the software level. Further description of the device or system is omitted.

Referring to FIG. 3, CCP 110 preferably allocates a socket to each of the plurality of target processors 112, 114, 116, and 121, so as to periodically monitor the status of each of the plurality of the target processors (Step 301). At this time, each of the plurality of the target processors, as well as the socket allocated to the CCP 110, preferably allocates its own socket to communicate with the CCP 110.

When the socket is allocated to each of the plurality of target processors, the CCP 110 periodically receives status messages from the plurality of the target processors. The CCP 110 reports the status of target processors to the BSM 130. Furthermore, the CCP 110 transmits its status to the plurality of target processors through a status message (Step 304). The CCP 110 preferably transmits the status message in a prescribed form when there is a request, via the socket, for the status message from the plurality of target processors.

Accordingly, each processor's status is periodically communicated between the CCP 110 and the plurality of target processor based on the connection through the socket.

Next, it is determined whether the status message has been received from the plurality of target processors (Step 307). That is, the CCP 110 requests the status message from each of the plurality of target processors according to a prescribed order. The CCP 110 next checks to determine whether a status message has been received from each of the plurality of target processors within a prescribed period of time. If the status message is received from each of the plurality of target processors within the prescribed period of time, then the CCP 110 determines that the target processor that has sent the status message is in normal state, and transmits a status change command generated from the status message to the target processor. The CCP 110 thus directs the status of the processor to be changed according to the status change command (Step 310).

If, however, the status message has not been received from a given one of the target processors within the prescribed time period, the CCP 110 transmits a status confirmation message to the target processor using UDP (Step 316). The state confirmation message is preferably transmitted by utilizing UDP through the port of the sender and the recipient designated by the UDP header.

The CCP 110 next checks to determine whether a response to the status confirmation message transmitted to the target processor has been received or not.

If a response is received to the status confirmation message from the target processor, the CCP 110 determines that there is an error on the socket allocated to the target processor and re-allocates the socket to the target processor after withdrawing the existing socket (Step 322).

If, however, the CCP 110 receives no response to the status confirmation message from the target processor, the CCP determines that a down state has occurred in the target processor, and releases the socket that has been allocated to that target processor (Step 325).

The above description relates to a method for managing a socket to release particular target processors, but whenever it is confirmed that the status message has not been received from any one of the plurality of the target processor, the CCP 110 may release the allocated socket in the target processor by transmitting the status message based on the response of the status confirmation message. In addition, it is noted that the socket allocated to the target processor could always be re-used on another target processor.

The present invention as broadly described herein has many advantages. For example, by releasing the socket allocation based on the receipt of the response on the status confirmation message and re-allocating the released socket to other target processor, the usage efficiency of the socket resource and the system performance can be enhanced.

Additionally, because a status message is no longer transmitted to the socket-released target processor, the load in the CCP is reduced, thus enhancing efficiency.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for managing a socket in a mobile communication system, comprising:

allocating a socket corresponding to a call control processor (CCP) in each one of a plurality of target processors;

communicating, via a first protocol, with each one of the plurality of target processors using the corresponding allocated socket;

releasing the socket allocated to a selected target processor based on a reception state of a status message corresponding to the selected target processor, wherein releasing the allocated socket comprises:

transmitting a status confirmation message, via a second protocol different than the first protocol, from the CCP to the selected target processor if the status message using the first protocol corresponding to the selected target processor is not received by the CCP within a prescribed period of time;

determining whether the status confirmation message has been received by the target processor; and determining whether to release the allocated socket according to the determination of the receipt of the status confirmation message;

determining whether the corresponding selected target processor has an error according to a response to the status confirmation message; and allocating a new socket rather than releasing the formerly allocated socket according to the result of the determination, wherein the selected target processor is determined to have an error if a response to the status confirmation message is received.

2. The method of claim 1, wherein the prescribed period of time commences when the CCI sends a status request message to the selected target processor.

3. The method of claim 1, further comprising:

determining whether the selected target processor is in a down state according to a response to the status confirmation message; and releasing the socket allocated to the selected target processor if the target processor is in a down state.

4. The method of claim 3, wherein the target processor is in a down state if no response is received to the status confirmation message.

5. The method of claim 1, further comprising determining that the selected target processor is in a down state when the CCP does not receive the response to the status confirmation message and determining that the selected target processor has a socket error when the CCP receives the response to the status confirmation message.

6. The method of claim 5, wherein the socket allocated to the selected target processor is released if it is determined that the selected target processor is in the down state, and wherein the socket allocated to the selected target processor is re-allocated if it is determined that the selected target processor has the socket error.

7. The method of claim 1, wherein the first protocol comprises a Transmission Control Protocol (TCP) and the second protocol comprises a User Datagram Protocol (UDP).

8. The method of claim 1, wherein releasing the socket allocation further comprises transmitting a status change message generated on the basis of the status message to the selected target processor when the status message is received.

9. The method of claim 1, wherein the reception state is one of received and not received.

10. A method for managing a socket in a mobile communication system, comprising:

communicating, via a first protocol, with each of a plurality of target processors using a socket allocated to each of the plurality of target processors;

transmitting, via a second protocol different than the first protocol, a status confirmation message to prescribed ones of the plurality of target processors based on a reception state of a corresponding status message, wherein the status confirmation message is transmitted to the prescribed ones of target processors if the corresponding status message is not received from the prescribed ones of the target processors within a prescribed period of time; and performing socket management based on a response to the status confirmation message, wherein the socket allocated to each of the prescribed target processors is withdrawn and a new socket is allocated when a corresponding response to the status confirmation message is received, and wherein the socket allocated to the prescribed target processor is released when the corresponding response to the status confirmation message is not received, wherein said performing comprises determining whether the prescribed target processor has an error according to the corresponding response to the status confirmation message, wherein the prescribed target processor is determined to have the error if the corresponding response to the status confirmation message is received.

11. The method of claim 10, wherein the reception state of the corresponding status message is one of received and not received.

12. The method of claim 10, wherein the prescribed period of time commences when a status request message is sent to the selected target processor.

13. The method of claim 10, wherein the first protocol comprises a Transmission Control Protocol (TCP) and the second protocol comprises a User Datagram Protocol (UDP).

14. A method of managing a socket in a mobile communication system, comprising:

allocating a socket between a call control processor (CCP) and each of a plurality of target processors;

sending, via a first protocol, a request status message from the CCP to each of the target processors using the corresponding socket;

sending, via a second protocol different than the first protocol, a status confirmation message from the CCP to non-responding target processors, wherein the status confirmation message is sent to target processors that fail to send a status message to the CCP in response to the status request message within a prescribed period of time; and one of reallocating the socket to the non-responding processors and releasing the socket to the non responding processor by determining that a selected target processor is in a down state when the CCP receives no response to the status confirmation message and determining that the selected target processor has a socket error when the CCP receives a response to the status confirmation message, wherein the socket allocated to the selected target processor is released if it is determined that the selected target processor is in the down state, and wherein the socket allocated to the selected target processor is re-allocated if it is determined that the selected target processor has the socket error.

15. The method of claim 14, wherein a new socket is allocated to a non responding target processor if the non responding target processor responds to the status confirmation message.

16. The method of claim 14, wherein the first protocol comprises a Transmission Control Protocol (TCP) and the second protocol comprises a user Datagram protocol (UDP).

* * * * *